United States Patent
Matlik et al.

(10) Patent No.: US 12,220,750 B2
(45) Date of Patent: Feb. 11, 2025

(54) CLAMPING DEVICE FOR TOOL HOLDER

(71) Applicant: AB SANDVIK COROMANT, Sandviken (SE)

(72) Inventors: Gunnar Matlik, Sandviken (SE); Jonas Wasterlund, Toyokawa (JP)

(73) Assignee: AB Sandvik Coromant, Sandviken (SE)

( * ) Notice: Subject to any disclaimer, the term of this patent is extended or adjusted under 35 U.S.C. 154(b) by 601 days.

(21) Appl. No.: 17/617,966

(22) PCT Filed: Jun. 9, 2020

(86) PCT No.: PCT/EP2020/065936
§ 371 (c)(1),
(2) Date: Dec. 10, 2021

(87) PCT Pub. No.: WO2020/249550
PCT Pub. Date: Dec. 17, 2020

(65) Prior Publication Data
US 2022/0250165 A1 Aug. 11, 2022

(30) Foreign Application Priority Data

Jun. 11, 2019 (EP) ..................................... 19179431

(51) Int. Cl.
*B23B 29/04* (2006.01)
*B23B 31/26* (2006.01)

(52) U.S. Cl.
CPC .......... *B23B 29/046* (2013.01); *B23B 31/261* (2013.01); *B23B 31/265* (2013.01); *Y10T 409/309464* (2015.01)

(58) Field of Classification Search
CPC ... B23B 29/046; B23B 31/261; B23B 31/265; Y10T 409/309464
See application file for complete search history.

(56) References Cited

U.S. PATENT DOCUMENTS 3,311,023 A * 3/1967 Kaiser ................... B23B 31/117
408/239 R
4,615,244 A * 10/1986 Reiter ................... B23B 29/046
82/160

(Continued)

FOREIGN PATENT DOCUMENTS

| DE | 3926480 A1 | 2/1991 |
| EP | 0155539 A1 | 9/1985 |
| EP | 2987573 A1 | 2/2016 |

(Continued)

*Primary Examiner* — Eric A. Gates
*Assistant Examiner* — Reinaldo A Vargas-Del Rio
(74) *Attorney, Agent, or Firm* — Corinne R. Gorski

(57) ABSTRACT

A clamping device is arranged for releasably holding a tool holder shank. The clamping device includes a housing, a drawbar mounted reciprocally movable inside a bore in the housing, and an actuator. An aperture extends along an actuator axis and is delimited by an aperture housing surface and a drawbar groove. A first locking pressure applying surface on the actuator acts upon a first locking pressure receiving surface in the drawbar groove to effectuate a displacement of the drawbar when the actuator is moved along the actuator axis in a first direction, resulting in clamping of the tool holder shank.

13 Claims, 6 Drawing Sheets

(56) References Cited

U.S. PATENT DOCUMENTS 5,340,248 A     8/1994   Enbergs
5,870,935 A *   2/1999   Erickson ................. B23B 31/30
                                                                 408/239 R

FOREIGN PATENT DOCUMENTS

WO             9111281   A1     8/1991
WO     WO-2005032747   A1 *   4/2005           B23B 29/046

* cited by examiner

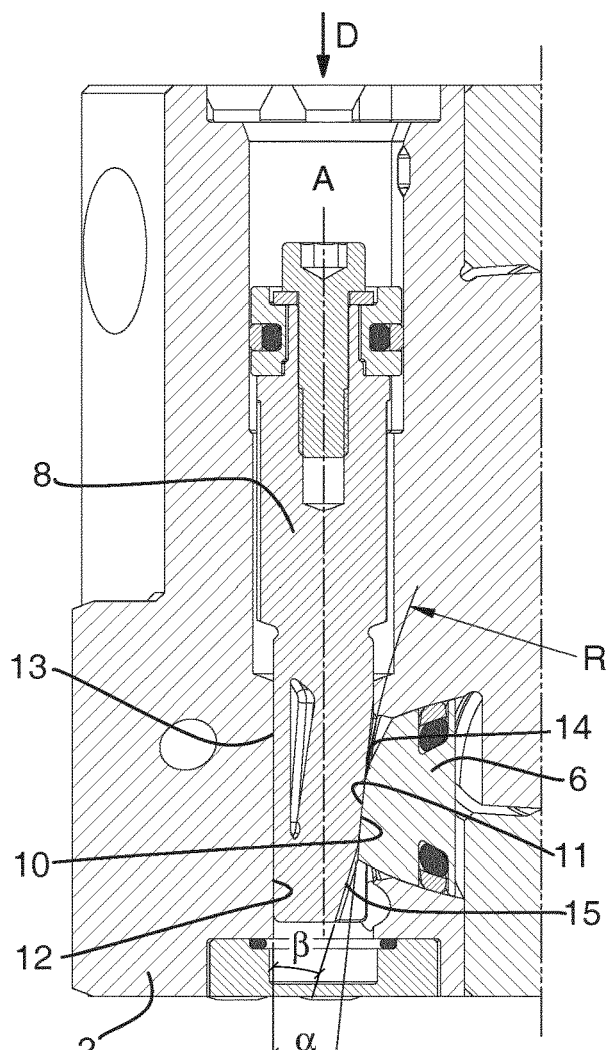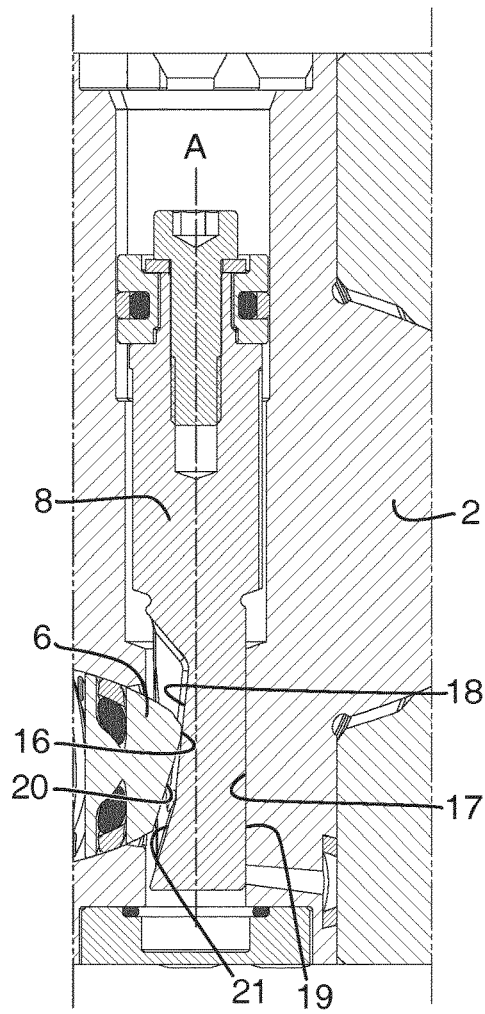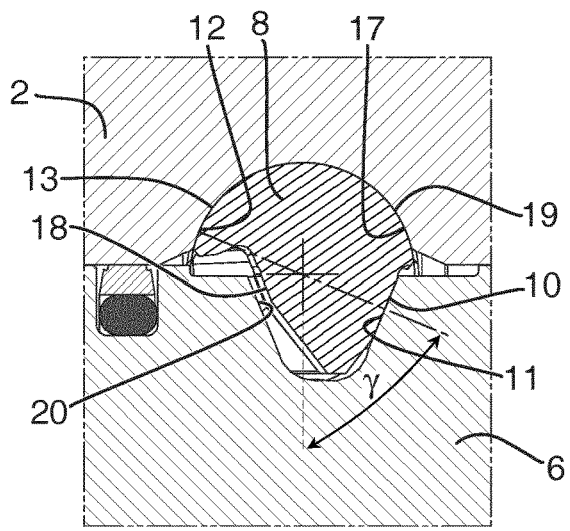

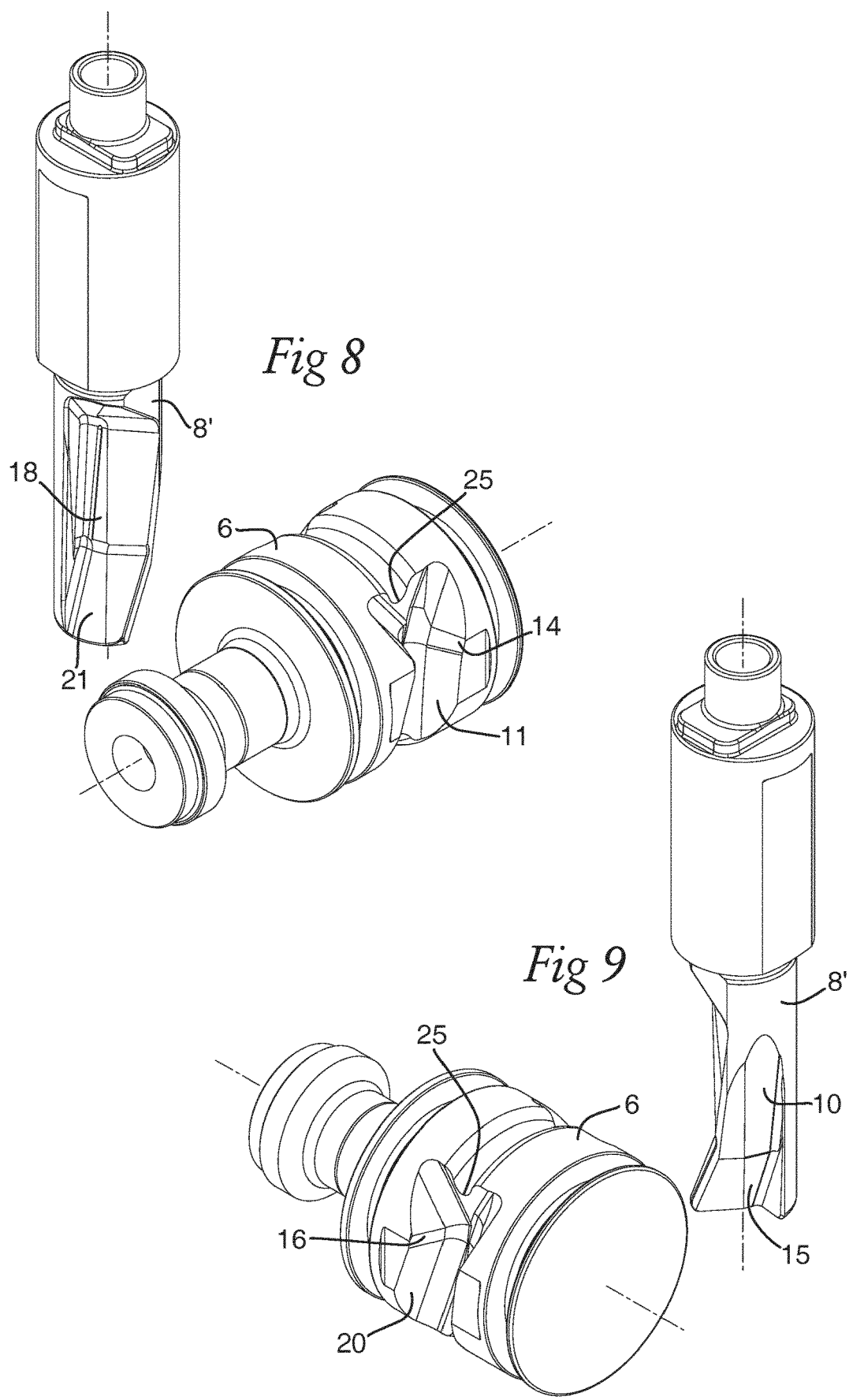

CLAMPING DEVICE FOR TOOL HOLDER

RELATED APPLICATION DATA

This application is a § 371 National Stage Application of PCT International Application No. PCT/EP2020/065936 filed Jun. 9, 2020 claiming priority to EP 19179431.2 filed Jun. 11, 2019.

TECHNICAL FIELD

The invention relates to clamping devices for tool holders.

BACKGROUND ART

Within the field of machine tools and metal cutting, a clamping mechanism is often used to connect a tool holder for cutting tools to the machine tool. Many clamping mechanisms require manual operation, for example actuation of a cam shaft, for clamping and/or releasing a tool holder. There are also clamping mechanisms that are adapted for automatic tool change processes, for example wherein a hydraulic piston is used to control the state of the clamping mechanism. However, such clamping mechanisms are normally quite bulky, and requires much space, particularly in a longitudinal direction, making them unsuitable for use in a tool turret of a machine tool wherein the available axial space for the clamping mechanism is limited.

EP2987573 discloses a relatively compact clamping device wherein a cam shaft is arranged within an aperture in a drawbar, and wherein the cam-shaft, when rotated 180°, displaces the drawbar to effectuate clamping of a tool holder. However, this clamping mechanism requires manual actuation and is not suitable for automatic tool change applications.

SUMMARY

It is an object of the present invention to mitigate the shortcomings of the prior art and to provide a clamping device for tool holders that are suitable for automatic tool change applications and for use in connection with a tool turret of a machine tool.

Thus, the invention relates to a clamping device for releasably holding a tool holder shank comprising:
- a housing having a forward end, a rear end and a bore intersecting the forward end and extending rearwardly therefrom for receiving the tool holder shank in a mounting portion at the forward end of the bore;
- a drawbar being mounted reciprocally movable inside the bore, along a longitudinal axis thereof, wherein the drawbar comprises, in a forward end, engagement means which are adapted to, when caused to assume a locking position, go into engagement with an engagement formation at the end of the tool holder shank;
- an actuator for displacing the drawbar along the longitudinal axis;
- an actuator axis that is non-parallel to the longitudinal axis; and
- a central plane including the longitudinal axis and being parallel to the actuator axis.

The clamping device comprises an aperture extending along the actuator axis, wherein the aperture is delimited by:
- an aperture housing surface comprised by at least a part of an inner surface of the housing, wherein the aperture housing surface comprises a housing locking support surface facing towards the rear end and towards the central plane; and
- a drawbar groove extending at least partly across the surface of the drawbar along the actuator axis, wherein the drawbar groove comprises a first locking pressure receiving surface facing towards the forward end and away from the central plane.

The actuator is received within the aperture and movable therein along the actuator axis, and comprises:
- a first locking pressure applying surface facing towards the rear end and towards the central plane for contacting the first locking pressure receiving surface, wherein the first locking pressure applying surface is, in a first direction along the actuator axis, inclined towards the actuator axis; and
- an actuator locking support surface facing towards the forward end and away from the central plane, for contacting the housing locking support surface.

The actuator and the aperture are such arranged that, when the actuator is moved through the aperture in the first direction, the first locking pressure applying surface slides and presses against the first locking pressure receiving surface, and the actuator locking support surface slides and presses against the housing locking support surface, to force the drawbar to displace inside the bore towards the rear, causing the engagement means to assume the locking position.

Such clamping device can be made very compact in the longitudinal direction since the drawbar is actuated via a member that is introduced in a direction that is non-parallel to the longitudinal axis (for example transversally to a line parallel to the longitudinal axis). Furthermore, the maneuvering of the actuator may be achieved by a simple linear movement along the actuator axis, i.e. without requiring rotation of a cam-shaft.

In the description and claims throughout this application the term "forward" or "front" is used to indicate a direction or position towards the outer opening of the bore through which a tool holder shank is inserted during clamping. In analogy, the terms "rear" or "rearward" are used to indicate a direction or position away from such outer opening of the bore.

Furthermore, as used herein, the expressions "facing towards" or "facing away from", for example in relation to a central plane or an end of the housing, for defining the orientation of a surface, indicates that the surface is oriented such as to face towards or away from the respective plane or end at least to some degree. Thus, the expression, when used in relation to a forward or rear end of the housing, does not only cover a configuration where the surface is perpendicular to the longitudinal axis of the bore, but also configurations wherein a normal to the surface extends at an acute angle of up to (but not including) 90° to the longitudinal axis. Correspondingly, the expression, when used in relation to a central plane, covers any configuration wherein a normal to the surface crosses the plane.

Since the first locking pressure applying surface is, in the first direction, inclined towards the actuator axis, a movement of the actuator in the first direction results in that a pressure is applied by the first locking pressure applying surface on the first locking pressure receiving surface of the drawbar. This pressure will have a component in the axial direction of the bore, such that the drawbar is displaced axially therein.

The first locking pressure receiving surface faces towards the forward end and may have a direction of extension that corresponds to, or substantially corresponds to, the extension of the first locking pressure applying surface, whereas the housing locking support surface faces towards the rear end (towards the actuator locking support surface) and may have a corresponding extension as the actuator locking support surface. Thereby, sliding contact between the respective surfaces is achieved over a large area during movement of the actuator, such that the applied force is distributed in a good way. The first locking pressure applying surface and the first locking pressure receiving surface may have a linear, or substantially linear, extension when viewed in a section along the actuator axis and parallel to a normal to the first locking pressure receiving surface. However, the extensions of the surfaces do not have to correspond entirely to each other. For example, the respective surfaces may have slightly different angles of inclination with respect to the actuator axis. As another example, one or both surfaces, when viewed in a section along the actuator axis and parallel to a normal to the first locking pressure receiving surface, may have a slightly curved extension. For example, the first locking pressure receiving surface may be slightly curved in this view, with a large radius of curvature. Thereby, the risk for excessive pressure on the edges of the surfaces will be reduced. As long as the radius of curvature is large, in relation to the length of the surface, a sufficient area of contact between the surfaces will still be obtained when the first locking pressure applying surface slides and presses against the first locking pressure receiving surface.

The clamping device may comprise additional components, such as a piston, e.g. a hydraulic piston, for effectuating displacement of the actuator. Other means for changing the position of the actuator may be based on pneumatics, for example. Accordingly, the control of the clamping device can be easily automated, without requiring any manual operations. Thus, the clamping device according to the present disclosure is suitable for use in automatic tool change applications. However, it is also envisaged that the actuator could be displaced along the actuator axis by other means, including manual operations.

The first direction along the actuator axis may be an inwards direction through the aperture.

The aperture housing surface includes a housing locking support surface. According to some embodiments, the aperture entirely encloses the periphery of the actuator when the actuator is fully inserted into the aperture. Hence, the aperture housing surface may be a continuous, non-interrupted, smooth surface providing support to the actuator along a large part of the circumference of the actuator. However, it is also envisaged that the aperture housing surface includes irregularities, for example openings in the peripheral wall of the housing, and it does not have to be a completely continuous, regular, surface.

The first locking pressure receiving surface faces away from the central plane i.e. towards the housing locking support surface. The housing locking support surface will be exposed to a reaction force caused by the pressure asserted on the first locking pressure receiving surface. The first locking pressure receiving surface and the first locking pressure applying surface may be configured such that, in each transversal cross-section along the actuator axis, a normal to the first locking pressure receiving surface, extending to the housing locking support surface from the center of the length of contact between the first locking pressure receiving surface and the first locking pressure applying surface, passes through the actuator axis (i.e. the axial center of the actuator). In other words, the width and the inclination of these surfaces may be selected such that the reaction force caused by the force applied on the first locking pressure receiving surface will be directed through the actuator axis. Thereby, any unwanted torque on the actuator will be avoided. Such configuration may result in a tapering shape of the first locking pressure receiving surface and/or the first locking pressure applying surface. This is because these surfaces are also inclined towards the actuator axis.

A normal to the first locking pressure receiving surface forms an angle $\gamma$ to a normal to the central plane, wherein the angle $\gamma$ is between 0° and 90°. A small angle $\gamma$ may be inefficient and not well functioning in practice. On the other hand, an angle $\gamma$ that is too large may result in a design wherein the reaction force acting on the housing locking support surface is very close to the edge of the aperture housing surface, which might be unfavorable. Furthermore, a large angle $\gamma$ reduces the width that can be used for the first locking pressure applying surface, adversely affecting the force distribution since the area of contact will be small, causing a large surface pressure. The angle $\gamma$ may be between 45° and 85°. According to some embodiments, the angle $\gamma$ is between 55° and 75°, such as, for example, between 65° and 70°.

The aperture housing surface may have a semi-circular shape in a cross-section transversal to the actuator axis. Thus, the normal to the first locking pressure receiving surface, extending from the center thereof through the actuator axis, will be perpendicular also to the housing locking support surface when seen in a cross-section transverse to the actuator axis. Thereby, any unwanted torque or other adverse effects will be avoided.

As an alternative to a semi-circular shape, the aperture housing surface may comprise a plurality of flat sub-surfaces. It may be beneficial if the housing locking support surface, when seen in a cross-section transverse to the actuator axis, is perpendicular, or substantially perpendicular, to the force acting on the surface. Hence, the sub-surfaces of the aperture housing surface may be configured such that the flat sub-surface that corresponds to the housing locking support surface has the same inclination as the first locking pressure receiving surface when seen in a cross-section transverse to the actuator axis.

The actuator axis is non-parallel to the longitudinal axis. Thus, when the clamping device is seen in a view perpendicular to the central plane, the actuator axis does not extend in the same direction as the longitudinal axis. On the contrary, the actuator axis extends at a non-zero angle to a line parallel to the longitudinal axis, such that the actuator axis will cross such line. According to some embodiments, the actuator axis extends perpendicularly, or substantially perpendicularly, to a line parallel to the longitudinal axis.

The first locking pressure applying surface, when viewed in a section along the actuator axis and parallel to a normal to the first locking pressure receiving surface, may be inclined by a non-zero angle $\alpha$ to the actuator axis. The first locking pressure receiving surface may also have a linear, or substantially linear, extension in this view, correspondingly inclined to the actuator axis by the angle $\alpha$. Alternatively, although extending in generally the same direction, the first locking pressure receiving surface may be slightly curved in this view, e.g. convexly curved, instead of having a linear extension.

The angle $\alpha$ may be below a self-lock threshold angle, such that the actuator attains a self-locking state with respect to the drawbar when the drawbar has been displaced inside the bore towards the rear and the engagement means caused to assume the locking position. To obtain a self-locking state, the angle α should be sufficiently small, i.e. below the self-locking threshold angle. A self-locking state refers to a state in which the static friction force between the actuator and the aperture, including the static friction force between the first locking pressure receiving surface in the drawbar groove and the first locking pressure applying surface on the actuator, is greater than the opposing force in the plane of friction that is caused by a force applied to the actuator along the longitudinal axis. Hence, a self-locking state is obtained within an angular range that depends on the friction coefficient between the first locking pressure receiving surface of the drawbar groove and the first locking pressure applying surface of the actuator. This friction coefficient may depend on various parameters, such as the materials used, coatings on the surfaces, use of lubricants, etc. Hence, the self-lock threshold angle is dependent on some or all of these parameters. A person skilled in the art will be able to identify the self-lock threshold angle that apply for a certain application by using common general knowledge and/or routine experiments, or at least predict or assess whether a certain angle is below such self-lock threshold angle. In general, it is preferred to choose an angle α that is well below the self-lock threshold angle, to assure a self-locking configuration. A further benefit of using a small angle α is that a force-amplifying effect is achieved, wherein a relatively large displacement of the actuator in the first direction along the actuator axis will result in a relatively small displacement of the drawbar along the longitudinal axis. However, too small angle α may be inefficient and not practically well-functioning. For example, a very small angle α may result in that the clamping device gets stuck in a clamped state, and the actuator is difficult to release. According to some embodiments, the angle α may be between 2° and 12°. In such range, both a self-locking configuration and an appropriate force-amplifying effect may be achieved. For example, the angle α may be between 3° and 8°, for example 5°, or approximately 5°.

The drawbar groove may comprise a second locking pressure receiving surface facing towards the forward end and away from the central plane, and the actuator may comprise a second locking pressure applying surface facing towards the rear end and towards the central plane, for contacting the second locking pressure receiving surface, wherein the second locking pressure applying surface is, in the first direction, inclined towards the actuator axis with a higher angle of inclination compared to the first locking pressure applying surface.

When using multiple locking pressure applying surfaces and corresponding locking pressure receiving surfaces, a clamping mechanism can be designed wherein both the required motion of the drawbar and a good force amplifying effect can be easily achieved. The second pressure applying surface, when viewed in a section along the actuator axis and parallel to a normal to the first locking pressure receiving surface, may be inclined by a non-zero angle β to the actuator axis, wherein the angle β is greater than the angle α, and wherein the respective first and second surfaces are arranged consecutively such that, upon a movement of the actuator in the first direction, the second locking pressure applying surface slides and presses against the second locking pressure receiving surface before the first locking pressure applying surface slides and presses against the first locking pressure receiving surface.

Thereby, the drawbar may be quickly displaced, or transported, during the initial phase of the clamping by using the larger angle β. This initial clamping phase does not require much force. However, during the final phase of the clamping, a great force is required for displacing the drawbar a short distance. Hence, when the actual clamping occurs, i.e. when the engagement means assumes the locking position, the smaller angle α will be used such that the displacement of the drawbar will be small compared to the displacement of the actuator along the actuator axis, resulting in a force amplifying effect, also referred to as "power boost". According to some embodiments, the angle β may be between 10° and 60°, providing an efficient initial displacement of the drawbar. For example, the angle β may be between 15° and 25°, such as 17°, or approximately 17°.

The respective surfaces may be such arranged that, when the actuator has been moved in the first direction such that the second locking pressure applying surface has passed the second locking pressure receiving surface and the first locking pressure applying surface reaches the first locking pressure receiving surface, i.e. at the transition between these respective surfaces, the drawbar has almost, but not entirely, reached its final destination at the rear end of the bore, i.e. before the tool holder shank has been drawn into firm bearing against the surfaces of the mounting portion. This is because it may be beneficial if the first locking pressure applying surface has slid some distance onto the first locking pressure receiving surface before the final clamping occurs, such that there will be a sufficient area of contact between these surfaces when the pressure increases in the final phase of the clamping.

By using a steep angle for the initial displacement of the drawbar and a small angle for the actual clamping, the actuator can be made relatively short, and the clamping device compact, while still providing a self-locking clamping mechanism with a significant force amplification effect.

The transitions between the first and second locking pressure applying surfaces, and the first and second locking pressure receiving surfaces, respectively, may be smooth, e.g. rounded, such that there is a sufficient area of contact between the respective pressure applying and pressure receiving surfaces also during the transition from the second surface to the first surface.

The actuator may be arranged such as to be movable, at least to some extent, also in a rotational direction with respect to the actuator axis. Thereby, the actuator is, to some small extent, displaceable around the actuator axis. As a consequence, the actuator will be able to automatically compensate for geometrical deviations or defects of one or more of the components, by adapting its position within the aperture with respect to the drawbar groove and the aperture housing surface, such that all contacting surfaces are in firm contact with each other during use of the clamping device.

The aperture housing surface may further comprise a housing releasing support surface facing towards the front end and towards the central plane, and the drawbar groove may further comprise a first releasing pressure receiving surface facing towards the rear end and away from the central plane. Correspondingly, the actuator may further comprise:

a first releasing pressure applying surface facing towards the forward end and towards the central plane, for contacting the first releasing pressure receiving surface, wherein the first releasing pressure applying surface is, in the first direction, inclined away from the actuator axis; and an actuator releasing support surface facing towards the rear end and away from the central plane, for contacting the housing releasing support surface.

The actuator and the aperture may be arranged such that, when the actuator is moved through the aperture in a direction opposite the first direction, the first releasing pressure applying surface slides and presses against the first releasing pressure receiving surface, and the actuator releasing support surface slides and presses against the housing releasing support surface, to force the drawbar to displace inside the bore towards the front.

Thereby, the clamping can be released simply by moving the actuator in a direction opposite the first direction.

The drawbar groove may comprise a second releasing pressure receiving surface facing towards the rear end and away from the central plane, and the actuator may comprise a second releasing pressure applying surface facing towards the forward end and towards the central plane, for contacting the second releasing pressure receiving surface. The second releasing pressure applying surface may, in the first direction, be inclined away from the actuator axis with a higher angle of inclination compared to the first releasing pressure applying surface.

The respective first and second releasing surfaces may be arranged consecutively such that, upon a movement of the actuator in a direction opposite the first direction, the first releasing pressure applying surface slides and presses against the first releasing pressure receiving surface before the second releasing pressure applying surface slides and presses against the second releasing pressure receiving surface.

The clamping device may comprise an additional actuator, wherein the two actuators are received within two different apertures located on opposite sides of the drawbar, and wherein the geometry of the two actuators, and the respective apertures, is mirrored.

Thereby, a well-balanced, symmetrical, clamping device is obtained, with good force distribution and wherein any undesirable bending moments or other unwanted effects are avoided.

The two actuators may be fixedly arranged to each other with respect to a direction parallel to the actuator axis, such that their axial movement within their respective apertures is synchronized. Thereby, synchronized control of the actuators is simplified. As an example, a single hydraulic piston may be arranged to both actuators, for effectuating synchronized movement thereof. However, it may be beneficial if the actuators are connected in such a way as to be, at least to some degree, rotationally movable, independently from each other, around their respective actuator axes.

The mounting portion at the forward end of the bore may be conical, and may also have a non-circular cross section. The conical shape ensures a connection free from play in the radial as well as the axial direction, whereas the non-circular cross-section (e.g. with a "triangular" or polygonal shape) ensures an nonrotatable fixation of the mounting shank in relation to the mounting bore.

It is apparent that the invention can be varied and modified in many different ways within the scope of the claims. For example, in the hereinafter described and illustrated exemplary embodiment of the invention, the mounting bore of the clamping device is conically formed and has a somewhat "triangular" or polygonal shape in cross section for clamping a tool holder having a similarly shaped mounting shank. However, the mounting bore could also have a different shape for clamping other types of mounting shanks.

BRIEF DESCRIPTION OF DRAWINGS

In the following, example embodiments will be described in greater detail and with reference to the accompanying drawings, in which:

FIG. 4 shows a part of the clamping device in a clamped state in a section as indicated in FIG. 3.

FIG. 5 shows a part of the clamping device in a clamped state in a section as indicated in FIG. 3.

FIG. 6 is an enlarged view of the actuator as seen in the cross-section in FIG. 3.

FIGS. 8-9 are two isometric views from different perspectives of the drawbar and one of the actuators, separated from each other.

Figure 1:
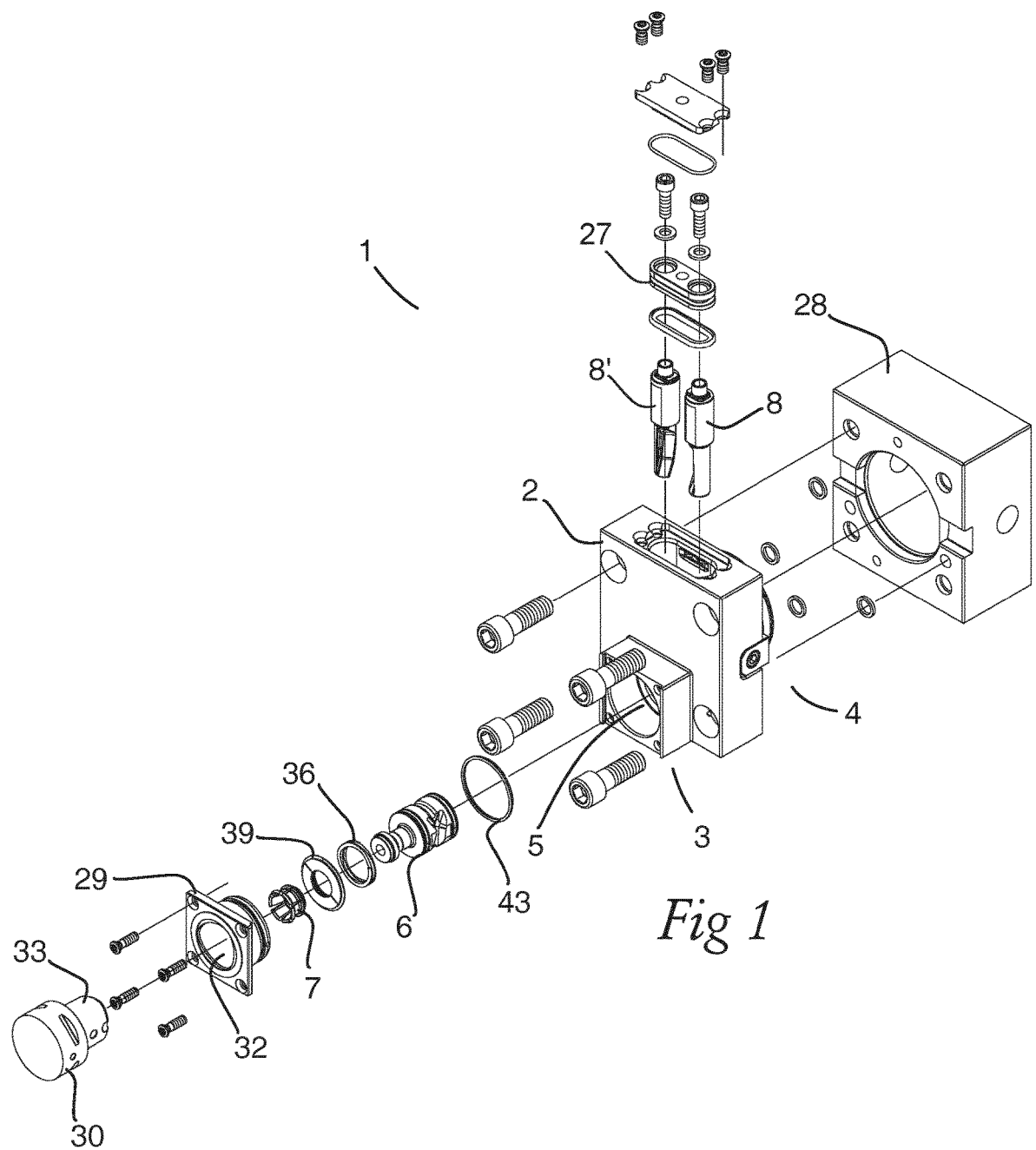
FIG. 1 is an exploded view of a clamping device for a tool turret.

All the figures are schematic, not necessarily to scale, and generally only show parts which are necessary in order to elucidate the respective embodiments, whereas other parts may be omitted or merely suggested. Unless otherwise indicated, like reference numerals refer to like parts in different figures.

DETAILED DESCRIPTION OF EMBODIMENTS

FIG. 1 is an exploded view of a clamping device 1, also showing a tool holder 30 (only schematically shown), and a tool turret member 28 to which the clamping device is mounted. The clamping device comprises two actuators 8, 8' and a housing 2 having a forward end 3, a rear end 4, and a bore 5 in which a drawbar 6 is arranged. Moreover, the clamping device includes a clamping mechanism that comprises engagement means, in the form of engagement segments 7, a retainer ring 39 and a compression spring 36. The tool holder 30 comprises a tool holder shank 33 to be clamped within a mounting portion 32 of the bore. In this embodiment, the mounting portion 32 is comprised in a sleeve 29 arranged in the bore 5 at the forward end of the housing 2. A sealing ring 43 is arranged between the sleeve 29 and the inner surface of the housing 2. The clamping device further comprises a hydraulic piston 27 connected to the actuators 8, 8', wherein hydraulic fluid can be introduced via openings in the tool turret member 28 for effectuating movement of the piston 27. As seen in FIG. 1, the clamping device comprises additional components, such as sealing elements and screws for assembling the different parts of the clamping device and for mounting the clamping device to the tool turret member 28.

Figure 2:
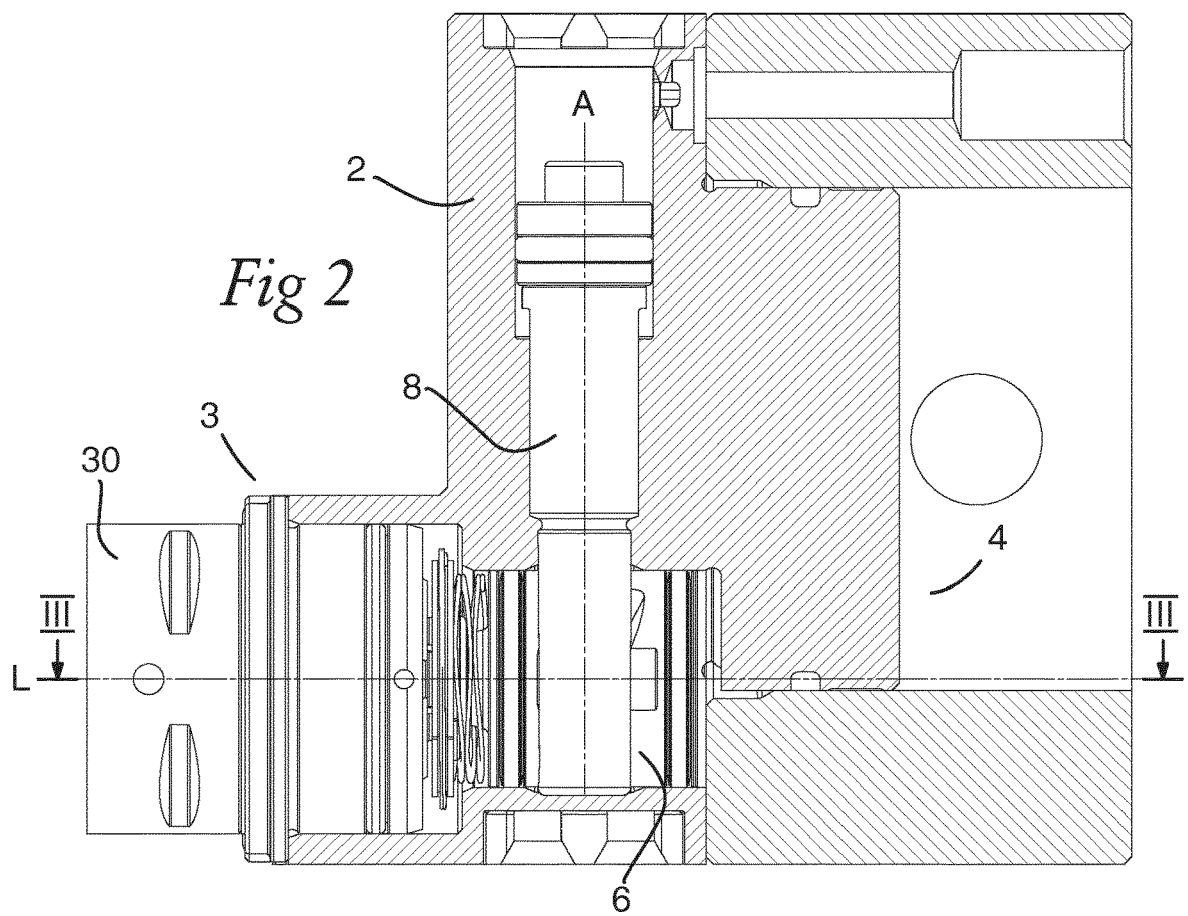
FIG. 2 is a side view of the clamping device in a clamped state, wherein the housing is shown in a section along the central plane of the clamping device, such as to expose the drawbar and the actuator.

FIG. 2 is a side view of the clamping device 1 in a clamped state, holding a tool holder 30, wherein the housing 2 is shown in a section along a central plane P (indicated in FIG. 3) of the clamping device, such as to expose the drawbar 6 and the actuator 8. The actuator extends along an actuator axis A and the drawbar 6 extends within a bore 5 along a longitudinal axis L.

Figure 3:
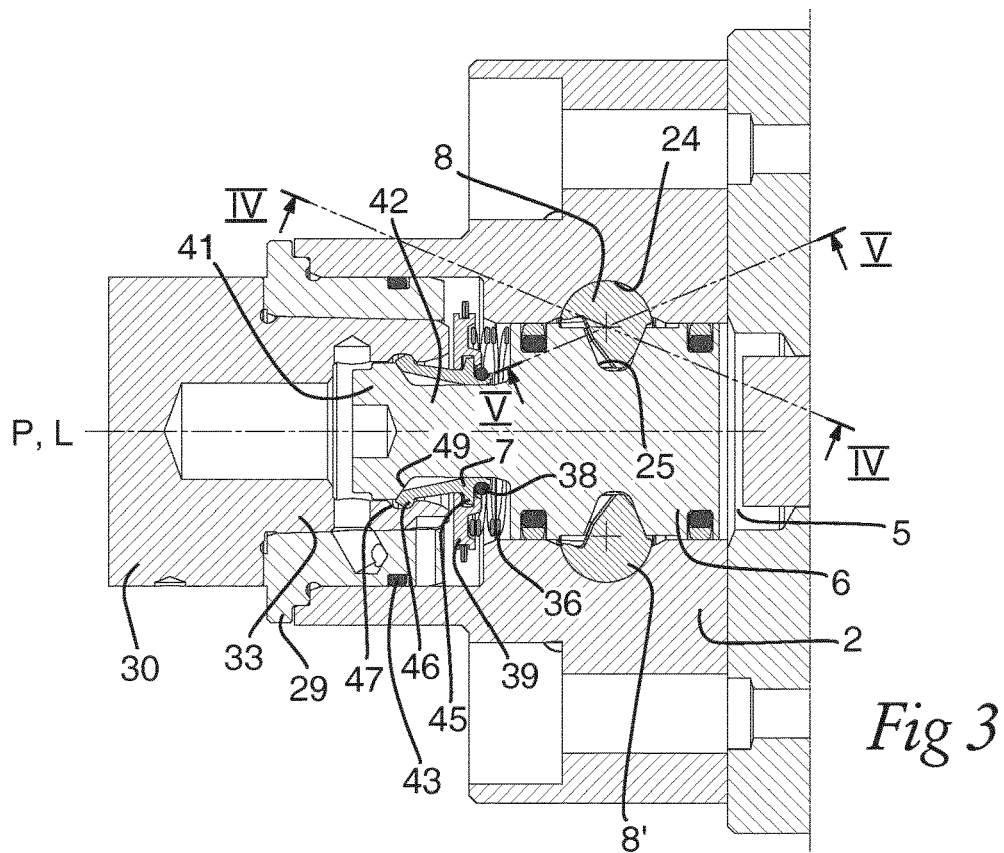
FIG. 3 shows the clamping device and tool holder in a clamped state in a cross-section as indicated in FIG. 2.

FIG. 3 shows the clamping device 1 and tool holder 30 in a cross-section as indicated in FIG. 2, i.e. in a cross-section along the longitudinal axis and perpendicular to the central plane P.

The tool holder 30 is provided with a mounting shank 33, which in the illustrated embodiment is of a kind disclosed in U.S. Pat. No. 5,340,248, comprising a conical shank having an axial bore and a somewhat "triangular" or polygonal, non-circular cross section, which is adapted to be drawn into a correspondingly shaped mounting portion 32. According to this embodiment, the coupling mechanism of the clamping device, which will be described later, comprises the engagement segments 7, a compression spring 36, a retainer ring 39 and an elastic O-ring 38, all arranged within the bore 5.

Each actuator 8, 8' is arranged within an aperture delimited by a drawbar groove 25 and an aperture housing surface 24.

FIG. 4 shows a part of the clamping device in a clamped state in a section as indicated in FIG. 3, i.e. in a section along the actuator axis A and parallel to a normal to a first locking pressure receiving surface 11. As seen in this view, the actuator 8 comprises a first locking pressure applying surface 10, a second locking pressure applying surface 15 and an actuator locking support surface 13. The aperture housing surface in the housing 2 comprises a housing locking support surface 12. The drawbar groove in the drawbar 6 comprises a first locking pressure receiving surface 11 and a second locking pressure receiving surface 14. In this view, the first and the second locking pressure applying surfaces 10, 15 are inclined to the actuator axis by an angle α and β, respectively. In this embodiment, the angle α is approximately 5° and the angle β is approximately 17°. Each of the first and the second locking pressure receiving surfaces 11, 14 has, in this view, an overall direction of extension that substantially matches the extension of the corresponding first and second locking pressure applying surfaces 10, 15. However, the first locking pressure receiving surface 11 is, in contrast to the first locking pressure applying surface, slightly convexly curved with a radius of curvature R that is large compared to the extension of the surface. The actuator 8 has reached the position showed in FIG. 4 by being displaced along the actuator axis A in the direction D.

FIG. 5 shows a part of the clamping device in a clamped state in a section as indicated in FIG. 3, i.e. in a section along the actuator axis A and parallel to a normal to a second releasing pressure receiving surface 20. As seen in this view, the actuator 8 comprises a first releasing pressure applying surface 18, a second releasing pressure applying surface 21 and an actuator releasing support surface 19. The aperture housing surface in the housing 2 comprises a housing releasing support surface 17. The drawbar groove in the drawbar 6 comprises a first releasing pressure receiving surface 16 and a second releasing pressure receiving surface 20. In this view, the first and the second releasing pressure applying surfaces 18, 21 are inclined from the actuator axis (A) wherein the second releasing pressure applying surfaces 21 is inclined by a higher angle of inclination compared to the first releasing pressure applying surface 18. Each of the first and the second releasing pressure receiving surfaces 16, 20 has, in this view, an overall direction of extension that substantially matches the extension of the corresponding first and second releasing pressure applying surfaces 18, 21.

FIG. 6 is an enlarged view of the actuator as seen in the cross-section in FIG. 3. With the actuator 8 in the position shown, this section extends through the first locking pressure applying surface 10 and the first releasing pressure applying surface 18 of the actuator, as well as through the first locking pressure receiving surface 11 and the second releasing pressure receiving surface 20 in the drawbar groove. As seen in FIG. 6, the aperture housing surface 24 is semi-circularly shaped in cross-section. Consequently, the housing locking support surface 12 and the housing releasing support surface 19 has the cross-sectional shape of circular arcs. The actuator locking support surface 13 and the actuator releasing support surface 19 are correspondingly shaped.

The first locking pressure applying surface 10 and the first locking pressure receiving surface 11 are inclined such that a normal to the first locking pressure receiving surface 11 forms an angle γ to a normal to the central plane P. In this embodiment, the angle γ is approximately 67.5°. Due to this inclination, the first locking pressure receiving surface 11 faces away from the central plane, i.e. towards the housing locking support surface 12. The width and inclination of the first locking pressure receiving surface 11 and the first locking pressure applying surface 10 have been selected such that the reaction force caused by the force asserted on the first locking pressure receiving surface 11 is directed through the actuator axis, i.e. through the axial center of the actuator.

Figure 7:
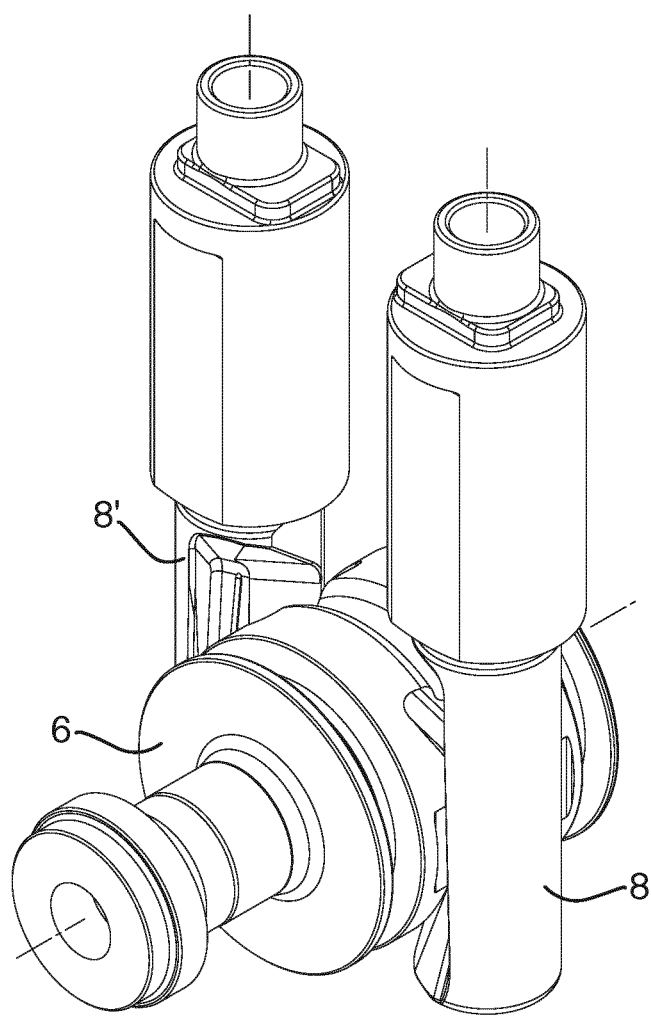
FIG. 7 is an isometric view of the drawbar and the actuators.

FIG. 7 is an isometric view of the drawbar 6 and the actuators 8, 8'.

FIGS. 8-9 are two isometric views from different perspectives of the drawbar 6 and one of the actuators 8', wherein the drawbar 6 and the actuator 8' is depicted separated from each other. These figures further clarify the configuration of the first and second locking- and releasing pressure applying surfaces 10, 15, 18, 21 on the actuator, and the first and second locking- and releasing pressure receiving surfaces 11, 14, 16, 20 in the drawbar groove 25.

Figure 10A:
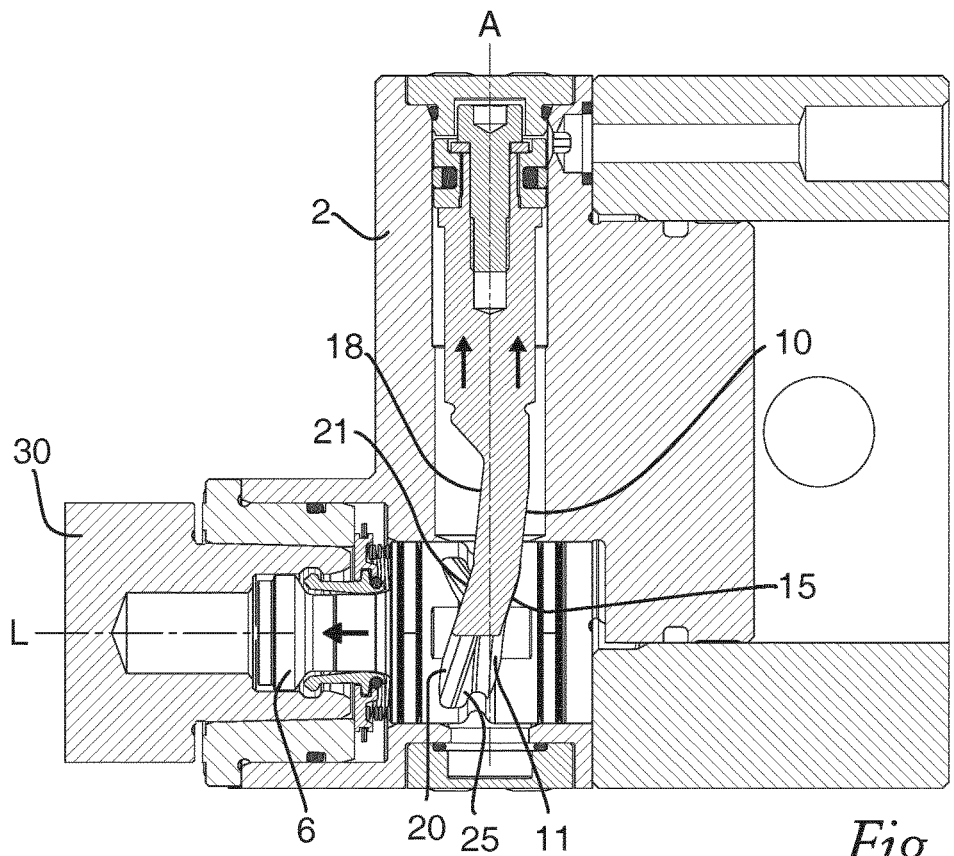
FIG. 10a shows the clamping device in an unclamped state in which the actuator has been moved outwards through the aperture, wherein the housing and the tool holder are shown in a cross-section along the central plane, whereas the actuator is shown in a cross-section through the actuator axis and parallel to the central plane, and the drawbar is shown in a side view such as to expose the drawbar groove.
Figure 10B:
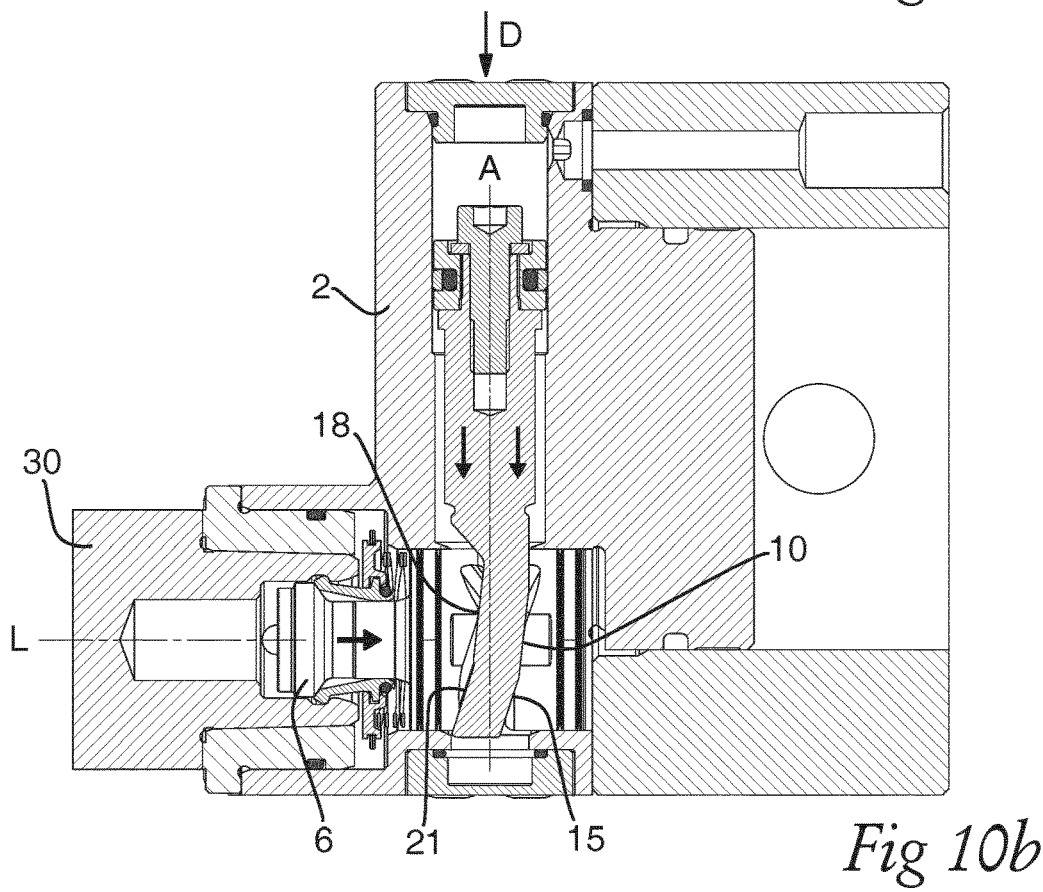
FIG. 10b is a corresponding view as in FIG. 10a, but where the clamping device is shown in a clamped state in which the actuator has been moved inwards through the aperture.

FIG. 10a shows the clamping device 1 in an unclamped state, wherein the housing 2 and the tool holder 30 are shown in a cross-section along the central plane P, whereas the actuator 8 is shown in a cross-section through the actuator axis A and parallel to the central plane P, and the drawbar 6 is shown in a side view such as to expose the drawbar groove 25. FIG. 10b is a corresponding view as in FIG. 10a, but where the clamping device 1 is shown in a clamped state.

In the following, the function of the clamping device 1 will be described.

The clamping device 1 in FIG. 10a is in an initial state in which the tool holder 30 is unlocked from the clamping device 1. As can be seen in FIG. 10a, with reference also to FIG. 3 in which details of the clamping mechanism are indicated, the engagement segments 7 are mounted around a neck portion 42 of the drawbar 6 in a space formed between the neck portion and an inner surface of an engagement bore within the mounting shank 33 of the tool holder 30. The engagement segments 7 are held in place by means of an outward extending flange portion 45 of each engagement segment being in engagement with an inner groove inside the retainer ring 39, and the elastic o-ring 38 is positioned in an outward facing groove formation in the rear end of the engagement segments. The forward ends of the engagement segments are formed with outward directed engagement flanges 46, which are adapted to go into engagement with an inner engagement groove 47 inside the engagement bore of the tool holder but are in the initial state shown in FIG. 10a out of engagement with the engagement groove.

Moreover, the compression spring 36 is mounted between a flange of the drawbar and the retainer ring 39, forcing the engagement segments 7 in the forward direction against a rear surface of the sleeve 29. To reach this unlocked state, the actuator 8 has been moved along the actuator axis in a direction opposite the first direction D. Hence, when the actuator 8 is moved outwards, in a direction opposite to the first direction D, from a starting position corresponding to the locked state as shown in FIG. 10b, the first releasing pressure applying surface 18 of the actuator 8 will slide and press against the first releasing pressure receiving surface 16 in the drawbar groove 25. Thereby, the drawbar 6 will be displaced within the bore 5 towards the front. Subsequently, when the first releasing pressure applying surface 18 has slid past the first releasing pressure receiving surface 16, and the actuator is moved further outwards through the aperture, the second releasing pressure applying surface 21 will slide and press against the second releasing pressure receiving surface 20, effectuating the final displacement of the drawbar that is required for causing the engagement segments 7 to leave the locked position and push the tool holder shank 33 out from the mounting portion 32.

Reference is now made to FIG. 10b in combination with FIG. 3. Here the clamping device is in a locked or clamped state in which the mounting shank 33 is coupled to the clamping device 1 by means of the coupling mechanism and drawn by means of the drawbar 6 with a large force into firm engagement within the mounting portion 32 of the sleeve 29.

This is accomplished by moving the actuator in the first direction D, i.e. inwards through the aperture, such that the drawbar 6 is displaced in a rearward direction, which is described in more detail further below. As can be seen from FIG. 3, the retainer ring 39 and the engagement segments 7 are still pushed forward toward the rear surface of the sleeve 29 by means of the compression spring 36, while the drawbar 6 is drawn rearward by means of the actuator 8. This has to effect that the engagement segments 7 will be displaced outwards in relation to the drawhead 41 such that their forward ends will slide on a rearward facing beveled surface 49 of the drawhead 41. In this way, the engagement flanges 46 on the forward ends of the engagement segments 7 will be displaced outwards into a locking position and go into engagement with the engagement groove 47 inside the engagement bore of the tool holder such that the tool holder shank 33 will be drawn by means of the drawbar 6 into firm bearing against the surfaces of the mounting portion 32 in the sleeve 29.

When the actuator 8 is moved inwards in the direction D from a starting position corresponding to the unlocked state as shown in FIG. 10a, the second locking pressure applying surface 15 of the actuator 8 will slide and press against the second locking pressure receiving surface 14 in the drawbar groove 25. Thereby, the drawbar 6 will be displaced within the bore 5 towards the rear. Due to the relatively steep inclination β (indicated in FIG. 4) of the second pressure applying- and receiving surfaces 15, 14, the drawbar will initially be displaced towards the rear quite fast. The relatively steep angle β is advantageous to use since the initial displacement of the drawbar 6 does not require much force.

The first and second locking pressure applying- and receiving surfaces 10, 15, 11, 14 are so arranged such that when the actuator has been moved in the first direction D such that the second locking pressure applying surface 15 has passed the second locking pressure receiving surface 14 and the first locking pressure applying surface 10 reaches the first locking pressure receiving surface 11, i.e. at the transition between these respective surfaces, the drawbar 6 has almost reached its final destination at the rear end of the bore 5. Hence, for the final clamping phase, in which a large force is beneficial, the first locking pressure applying- and receiving surfaces 10, 11 are active. In this phase, a relatively large movement of the actuator will result in a very small displacement of the drawbar 6, thus providing a force amplification effect. Furthermore, the small inclination α (indicated in FIG. 4) of the first pressure applying surface 10 will provide a self-locking effect wherein the clamping device will remain in the clamped state without requiring any additional means.

The invention claimed is:

1. A clamping device for releasably holding a tool holder shank, the clamping device comprising:

a housing having a forward end, a rear end and a bore intersecting the forward end and extending rearwardly therefrom for receiving the tool holder shank in a mounting portion at the forward end of the bore;

a drawbar mounted reciprocally movable inside the bore along a longitudinal axis thereof, wherein the drawbar includes, in a forward end, engagement means which are arranged to, when in a locking position, to engage with an engagement formation disposed at the end of the tool holder shank;

an actuator arranged for displacing the drawbar along the longitudinal axis;

an actuator axis that is non-parallel to the longitudinal axis;

a central plane including the longitudinal axis arranged parallel to the actuator axis; and an aperture extending along the actuator axis, wherein the aperture is delimited by:

an aperture housing surface by at least a part of an inner surface of the housing, wherein the aperture housing surface includes a housing locking support surface facing towards the rear end and towards the central plane;

a drawbar groove extending at least partly across the surface of the drawbar along the actuator axis, wherein the drawbar groove includes a first locking pressure receiving surface facing towards the forward end and away from the central plane, wherein the actuator is received within the aperture and movable therein along the actuator axis, and wherein the actuator includes a first locking pressure applying surface facing towards the rear end and towards the central plane for contacting the first locking pressure receiving surface, wherein the first locking pressure applying surface is, in a first direction along the actuator axis, inclined towards the actuator axis; and an actuator locking support surface facing towards the forward end and away from the central plane, for contacting the housing locking support surface, wherein the actuator and the aperture are arranged such that, when the actuator is moved through the aperture in the first direction, the first locking pressure applying surface slides and presses against the first locking pressure receiving surface, and the actuator locking support surface slides and presses against the housing locking support surface, to force the drawbar to displace inside the bore towards the rear, causing the engagement means to assume the locking position, wherein the aperture housing surface includes a housing releasing support surface facing towards the front end and towards the central plane the drawbar groove includes a first releasing pressure receiving surface facing towards the rear end and away from the central plane, and the actuator includes a first releasing pressure applying surface facing towards the forward end and towards the central plane, for contacting the first releasing pressure receiving surface, wherein the first releasing pressure applying surface is, in the first direction, inclined away from the actuator axis, and an actuator releasing support surface facing towards the rear end and away from the central plane, for contacting the housing releasing support surface, and wherein the actuator and the aperture are arranged such that, when the actuator is moved through the aperture in a direction opposite the first direction, the first releasing pressure applying surface slides and presses against the first releasing pressure receiving surface, and the actuator releasing support surface slides and presses against the housing releasing support surface to force the drawbar to displace inside the bore towards the front.

2. The clamping device according to claim 1, wherein a normal to the first locking pressure receiving surface forms an angle $\gamma$ to a normal to the central plane, wherein $55°\leq\gamma\leq75°$.

3. The clamping device according to claim 1, wherein the aperture housing surface has a semi-circular shape in a cross-section transversal to the actuator axis.

4. The clamping device according to claim 1, wherein the actuator axis extends perpendicularly, or substantially perpendicularly, to a line parallel to the longitudinal axis.

5. The clamping device according to claim 1, wherein the first locking pressure applying surface, when viewed in a section along the actuator axis and parallel to a normal to the first locking pressure receiving surface, is inclined by a non-zero angle $\alpha$ to the actuator axis.

6. The clamping device according to claim 5, wherein the drawbar groove includes a second locking pressure receiving surface facing towards the forward end and away from the central plane, and the actuator includes a second locking pressure applying surface facing towards the rear end and towards the central plane, arranged for contacting the second locking pressure receiving surface, wherein the second locking pressure applying surface is, in the first direction, inclined towards the actuator axis with a higher angle of inclination compared to the first locking pressure applying surface.

7. The clamping device according to claim 6, wherein the second locking pressure applying surface, when viewed in a section along the actuator axis and parallel to a normal to the first locking pressure receiving surface, is inclined by a non-zero angle $\beta$ to the actuator axis, wherein the angle $\beta$ is greater than the angle $\alpha$, and wherein the respective first and second locking pressure applying and receiving surfaces are arranged consecutively such that, upon a movement of the actuator in the first direction, the second locking pressure applying surface slides and presses against the second locking pressure receiving surface before the first locking pressure applying surface slides and presses against the first locking pressure receiving surface.

8. The clamping device according to claim 1, wherein the non-zero angle $\alpha$ is below a self-lock threshold angle, such that the actuator attains a self-locking state with respect to the drawbar when the drawbar has been displaced inside the bore towards the rear and the engagement means caused to assume the locking position.

9. The clamping device according to claim 1, wherein the drawbar groove includes a second releasing pressure receiving surface facing towards the rear end and away from the central plane, and the actuator includes a second releasing pressure applying surface facing towards the forward end and towards the central plan, for contacting the second releasing pressure receiving surface, wherein the second releasing pressure applying surface is, in the first direction, inclined away from the actuator axis (A) with a higher angle of inclination compared to the first releasing pressure applying surface.

10. The clamping device according to claim 1, further comprising an additional actuator, wherein the two actuators are received within two different apertures located on opposite sides of the drawbar, and wherein the geometry of the two actuators, and the respective apertures, is mirrored.

11. The clamping device according to claim 10, wherein the two actuators are fixedly arranged to each other with respect to a direction parallel to the actuator axis, such that their axial movement within their respective apertures is synchronized.

12. The clamping device according to claim 1, wherein the mounting portion at the forward end of the bore is conical.

13. The clamping device according to claim 1, wherein the mounting portion at the forward end of the bore has a non-circular cross section.

* * * * *